US006713745B2

(12) United States Patent
Lin

(10) Patent No.: US 6,713,745 B2
(45) Date of Patent: *Mar. 30, 2004

(54) DISPLAY DEVICE WITH FEEDBACK BRIGHTNESS SENSING

(75) Inventor: Chiang Hung Lin, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,123

(22) Filed: Jun. 28, 2002

(65) Prior Publication Data

US 2004/0000629 A1 Jan. 1, 2004

(51) Int. Cl.⁷ .................................................. G01J 1/32
(52) U.S. Cl. ..................................... 250/205; 250/214 R
(58) Field of Search ............................ 250/205, 214 R, 250/208.1, 214 D, 214 AL, 214 B, 214 DC; 345/7–12, 48, 50, 84, 87

(56) References Cited

U.S. PATENT DOCUMENTS 6,483,245 B1 * 11/2002 Weindorf et al. ............. 315/82

* cited by examiner

Primary Examiner—Que T. Le
(74) Attorney, Agent, or Firm—Browdy and Neimark

(57) ABSTRACT

The present invention provides a display device with feedback brightness sensing, suitable for using in a PDA, that comprises a LCD panel at an outside of which is installed a first photo-sensor for sensing a light brightness variation of its environment. A corresponding sensing signal is delivered to a first converter to be converted to a first digital reference signal that is delivered to a microprocessor for determining a brightness increase or decrease of the display panel. Via a light-guiding element and a second photo-sensor installed within the display panel, the light brightness from the display panel is sensed and converted to a second digital reference signal that is compared with the first digital reference signal to determine whether the display brightness is at an optimal value. An automatic brightness adjustment of the display device is thereby achieved to reduce power consumption and protect the user's eyes.

11 Claims, 3 Drawing Sheets

DISPLAY DEVICE WITH FEEDBACK BRIGHTNESS SENSING

BACKGROUND OF THE INVENTION

1. Field of the Invention

The present invention relates to a display device with feedback brightness sensing. More particularly, the present invention provides a display device that can automatically adjust the display brightness via a disposition of photo-sensors so as to achieve a feedback brightness sensing.

2. Description of the Related Art

A liquid crystal display (LCD) panel provides a planar display that is broadly used in portable electronic equipment such as portable computers, personal digital assistants (PDA) and more recently developed web pads. The rapid expansion of LCD panel hence increasingly replaces for the traditional cathode-ray-tube (CRT) display. The principal advantages of LCD panels lie in a substantial reduction of its size and weight and, furthermore, since LCD panels do not need an electron accelerator structure, the rear side and the screen thickness are therefore considerably reduced in comparison with traditional CRT devices.

Although the numerous advantages described above, LCD panels also have some inconveniences. Well known downsides hence include an inferior image quality, comprising, for example, a lower display contrast and a angle of view narrower. Regarding some aspects, a LCD device therefore still does not provide a quality equal to that of CRT device. More particularly, the inferiority of the display contrast of the LCD device is all the more emphasized in an operating environment with relatively high light brightness. As a result, the display quality is therefore greatly dependent upon the operating environment. Although some LCD devices are provided with automatic adjustment of light brightness and contrast, these types of adjustment known in the prior art are however in accordance with the displayed frame and further requires a voluntary activation from the user. Therefore, in order to obtain an optimal display, the user usually has to voluntarily adjust the display parameters of the LCD device. When the light brightness of the environment is higher, the display contrast or brightness has to be adjusted higher to obtain a better sight effect. When the light brightness of the environment is darker, the display contrast or brightness has to be lowered to reduce the power consumption. For the user, these operations are usually cumbersome to achieve.

SUMMARY OF THE INVENTION

It is therefore a principal object of the present invention to provide a display device with feedback brightness sensing that can automatically adjust the display brightness of the display device according to a variation of the light brightness of the environment of the display device.

It is another object of the present invention to provide a display device with feedback brightness sensing that can provide an optimal display brightness that matches with the environment conditions by means of a feedback sensing.

Furthermore, it is another object of the present invention to provide a display device with feedback brightness sensing that can prevent excessive display brightness or darkness of the display device with respect to the light conditions of the environment, thereby reducing the power consumption and protecting the user's eyes.

To accomplish the above and other objectives, a display device with feedback brightness sensing of the present invention comprises a display device, a first photo-sensor, a first converter, a light-guiding element, a feedback sensing unit and a microprocessor. The display device includes a display panel. The first photo-sensor senses a light variation of the environment of the display device, and outputs a corresponding sensing signal. The first converter is connected to the first photo-sensor and converts the sensing signal to a corresponding first digital reference signal. The light-guiding element receives and transmits a light brightness emitted from the display panel. The feedback sensing unit is comprised of a second photo-sensor and a second converter. The second photo-sensor senses a light variation from the light-guiding element that is converted to second digital reference signal via the second converter. The microprocessor controls the light brightness emitted from the display panel according to a variation of the first and second digital reference signals.

To provide a further understanding of the present invention, the following detailed description illustrates embodiments and examples of the present invention, this detailed description being provided only for illustration of the present invention.

BRIEF DESCRIPTION OF THE DRAWINGS

The drawings included herein provide a further understanding of the present invention. A brief introduction of the drawings is as follows.

DETAILED DESCRIPTION OF THE EMBODIMENTS

Figure 1:
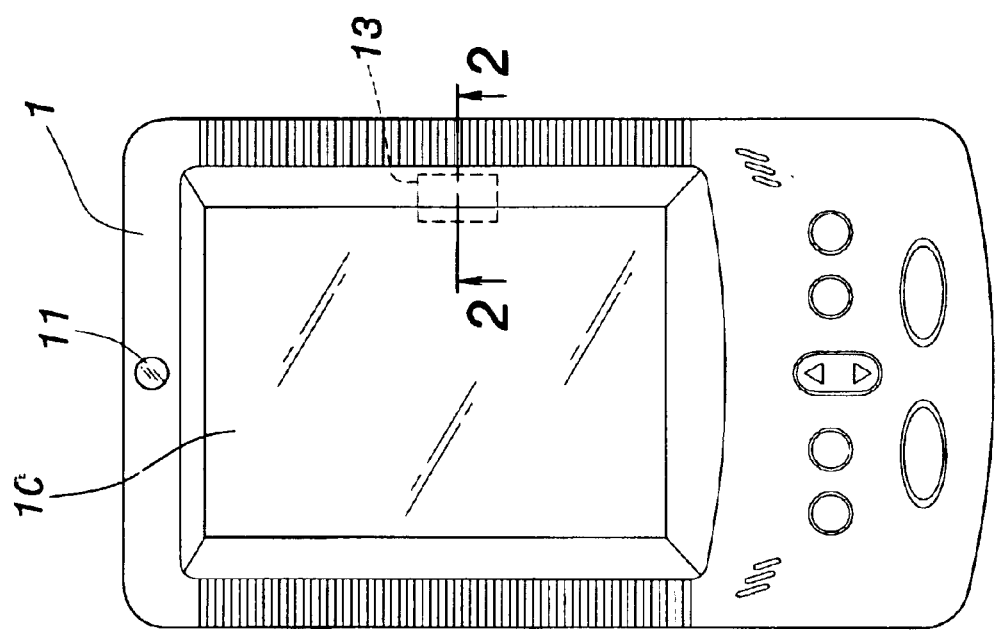
FIG. 1 is an outer view of an embodiment of the present invention.

Wherever possible in the following description, like reference numerals will refer to like elements and parts unless otherwise illustrated.

Figure 2:
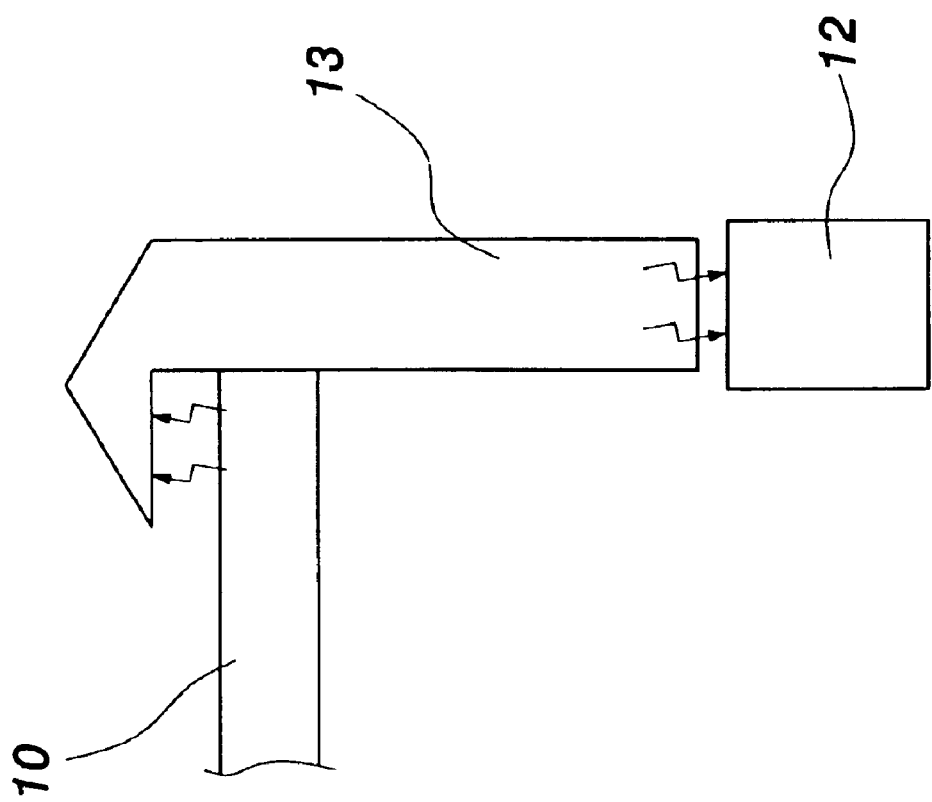
FIG. 2 is a sectional view of FIG. 1 along the section 2—2.

FIG. 1 and FIG. 2 are respectively an outer view and a sectional view of the embodiment of the present invention. As illustrated, a display device with feedback brightness sensing principally comprises a display device 1 having a display panel 10. The display device 1 may be mounted in, for example, a PDA as illustrated in this embodiment. The display panel 10 is typically a LCD panel. The display device 1 inwardly includes a control circuit (illustrated with more details in FIG. 3) that is electrically connected to the display panel 10 to control the brightness of the display panel 10. Proximate to a front face of the display panel 10 is arranged a groove (not shown) to enable the placement of a first photo-sensor 11. The first photo-sensor 11 is placed at an adequate location with respect to the user and the display device 1. The first photo-sensor 11, electrically connected to the control circuit, is a photo-sensitive resistor which resistance varies according to the light variation. Surrounding brightness can be thereby sensed. At a side of a light-emitting source of the display panel 10 is disposed a light-guiding element 13. A side of the light-guiding element 13 is further mounted in the display panel 10. The light-guiding element 13 is principally a light-guiding column used to receive and transmit the light brightness emitted from the display panel 10. Furthermore, a transparent body (not shown) may additionally cover the first photo-sensor 11 for protection purpose.

Figure 3:
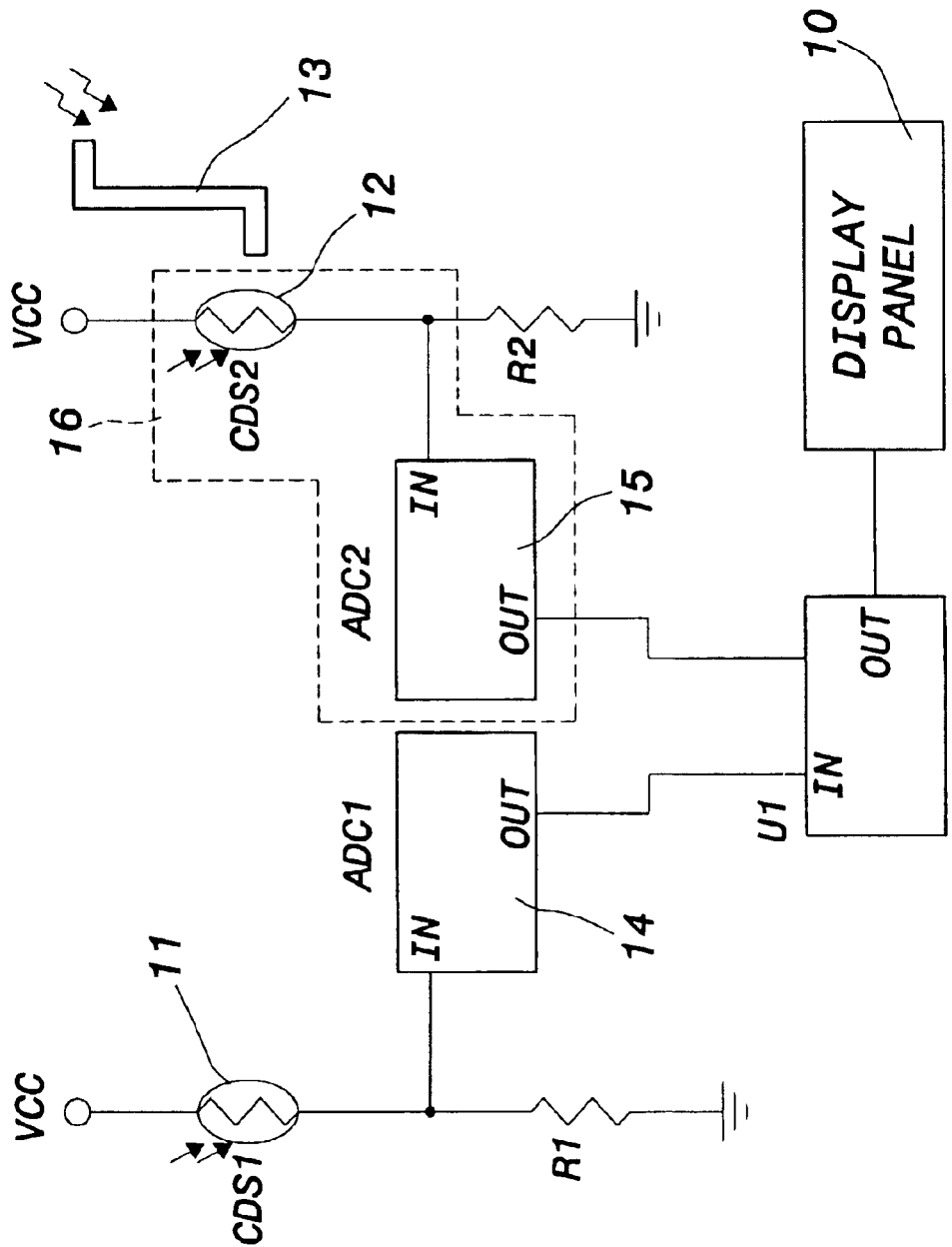
FIG. 3 is a circuit diagram of an internal circuitry of the embodiment of the present invention.

Referring to FIG. 3, a circuit diagram schematically illustrates an internal circuitry of the embodiment of the present invention. As illustrated, the internal circuitry of the present invention is comprised of photo-sensitive resistors CDS1, CDS2, resistors R1, R2, analog/digital (A/D) converters ADC1, ADC2, ad microprocessor U1. The first photo-sensor 11 is the photo-sensitive resistor CDS1 having one terminal electrically connected to a constant voltage source Vcc and another terminal electrically connected to a ground via the resistor R1 and to an input of the A/D converter ADC1, respectively. The photo-sensitive resistor CDS2 is a second photo-sensor 12 installed within an interior of the display panel 10 and proximate to the light-guiding element 13 (as shown in FIG. 2). A terminal of the photo-sensitive resistor CDS2 is electrically connected to the constant voltage source Vcc and another terminal is electrically connected to the ground via the resistor R2 and to an input of the A/D converter ADC2. The respective outputs of the A/D converters ADC1, ADC2 are electrically connected to the microprocessor U1, which has a terminal electrically connected to the display panel 10. The A/D converter ADC1 is designated a first converter 14, and the A/D converter ADC2 is designated a second converter 15. The second photo-sensor 12 and the second converter 15 compose a feedback sensing unit 16. The light emitted from the display panel 10 passes through the light-guiding element 13 to be directly transmitted to the second photo-sensor 12.

The first photo-sensor 11 senses a light variation of the environment of the display panel 10 and outputs a corresponding sensing signal. When the light brightness of the environment of the display panel 10 is increased, the resistance of the first photo-sensor 11 decreases and the voltage of the sensing signal delivered to the first converter 14 accordingly increases. The first converter 14 converts the sensing signal to a corresponding first digital reference signal that is delivered to the microprocessor U1. The microprocessor U1 compares this information from the first converter 14 with a preset value internally stored to determine the amount of brightness to be increased. Accordingly, the brightness of the inner lamps of the display panel 10 is progressively increased. At the same time, the resistance of the second photo-sensor 12, installed within the display panel 10 to receive the light variation of the display panel 10, decreases due to the increasing of the brightness of the display panel 10. The corresponding voltage delivered to the second converter 15 accordingly increases and is converted to a second digital reference signal delivered to the microprocessor U1. According to the variation of the first digital reference signal and the second digital reference signal, the microprocessor U1 accordingly controls the brightness of the light emitted from the display panel 10 and, through the control of the feedback sensing unit 16, achieves a certain brightness standard to protect the user's eyes.

When the light brightness of the environment of the display panel 10 decreases, the resistance of the first photo-sensor 11 accordingly increases, which reduces the voltage delivered to the first converter 14. The first converter 14 converts the sensing signal to a corresponding first digital reference signal that is delivered to the microprocessor U1. The microprocessor U1 compares this information from the first converter 14 with a preset value internally stored to determine the amount of brightness to be decreased. Accordingly, the brightness of the inner lamps of the display panel 10 is progressively decreased along which the resistance of the second photo-sensor 12, installed within the display panel 10 to receive the light variation of the display panel 10, increases. The corresponding voltage delivered to the second converter 15 accordingly decreases and is converted to a second digital reference signal delivered to the microprocessor U1. According to the variation of the first digital reference signal and the second digital reference signal, the microprocessor U1 accordingly controls the brightness of the light emitted from the display panel 10 and, through the control of the feedback sensing unit 16, achieves a certain brightness standard to reduce the power consumption.

The light brightness from the display panel 10 can be therefore adjusted in according to the light brightness of the environment of the display panel 10 to favorably achieve an optimal power consumption of the battery and a protection of the user's eyes. The user can therefore watches the display panel 10 in optimal conditions.

Furthermore, if the user chooses a manual adjustment of the light brightness of the display panel 10, this function being provided by the an application program of the display system, the microprocessor U1 then does not consider the signals delivered from the first and second converters 14, 15 and only takes into account the values manually inputted by the user.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A display device with feedback brightness sensing, comprising:

a display device, having a display panel;

a first photo-sensor, sensing a light brightness variation of an external environment of the display panel and outputting a corresponding sensing signal;

a first converter, connected to the first photo-sensor and converting the sensing signal to a corresponding first digital reference signal;

a light-guiding element, receiving and transmitting a light brightness emitted from the display panel;

a feedback sensing unit, comprised of a second photo-sensor and a second converter, the second photo-sensor sensing a light variation from the light-guiding element that is converted through the second converter to a second digital reference signal; and a microprocessor, controlling the light brightness emitted from the display panel according to a variation of the first and second digital reference signals.

2. The device of claim 1, wherein the display device is installed in a personal digital assistant (PDA).

3. The device of claim 1, wherein the display panel is a liquid crystal display (LCD) panel.

4. The device of claim 1, wherein the first photo-sensor is a photo-sensitive resistor.

5. The device of claim 1, wherein the first photo-sensor is installed on a front face of the display panel.

6. The device of claim 1, wherein the first converter is an analog/digital (A/D) converter.

7. The device of claim 1, wherein the light-guiding element is installed at a side of a light-emitting source of the display panel, a side of the light-guiding element being mounted in the display panel to directly receive and transmit a light brightness emitted from the display panel.

8. The device of claim 7, wherein the light-guiding element is a light-guiding column.

9. The device of claim 1, wherein the second photo-sensor is a photo-sensitive resistor.

10. The device of claim 1, wherein the second photo-sensor is installed within the display panel proximate to the light-guiding element.

11. The device of claim 1, wherein the second converter is a A/D converter.

* * * * *